(12) United States Patent
Shah et al.

(10) Patent No.: US 7,834,306 B2
(45) Date of Patent: Nov. 16, 2010

(54) DARK CURRENT AND LAG REDUCTION

(75) Inventors: Joey Shah, Thousand Oaks, CA (US);
Laurent Blanquart, Westlake Village, CA (US)

(73) Assignee: AltaSens, Inc., Westlake Village, CA (US)

( * ) Notice: Subject to any disclaimer, the term of this patent is extended or adjusted under 35 U.S.C. 154(b) by 312 days.

(21) Appl. No.: 12/053,670

(22) Filed: Mar. 24, 2008

(65) Prior Publication Data
US 2009/0236500 A1     Sep. 24, 2009

(51) Int. Cl.
*H03F 3/08* (2006.01)
*H01L 27/00* (2006.01)
*H04N 3/14* (2006.01)

(52) U.S. Cl. .............................. 250/214 R; 250/208.1; 348/308

(58) Field of Classification Search ............. 250/214 R, 250/208.1, 214 A, 214 LA, 214 C, 214.1, 250/214 LS, 214 SW; 348/302–308, 372; 257/204, 207, 208; 327/514, 535–537; 365/189.11, 365/226
See application file for complete search history.

(56) References Cited

U.S. PATENT DOCUMENTS

| | | | | |
|---|---|---|---|---|
| 6,297,687 B1 * | 10/2001 | Sugimura | .................... | 327/536 |
| 7,110,038 B2 * | 9/2006 | Watanabe et al. | ........... | 348/372 |
| 7,397,020 B2 * | 7/2008 | Roh | ........................ | 250/208.1 |
| 2008/0074519 A1 * | 3/2008 | Rysinski et al. | ............. | 348/294 |

* cited by examiner

*Primary Examiner*—Georgia Y Epps
*Assistant Examiner*—Don Williams
(74) *Attorney, Agent, or Firm*—Turocy & Watson, LLP

(57) ABSTRACT

The claimed subject matter provides systems and/or methods that facilitate reducing dark current and lag in a CMOS imaging System-on-Chip (iSoC) sensor. For instance, a vertical output driver can output a signal upon a node connected to gates of reset transistors and/or gates of transfer transistors of pixels in the pixel array while operating in rolling shutter mode and/or global shutter mode. Further, a pre-charger can transition a voltage of the node to a first voltage level. Moreover, a booster can further adjust the voltage of the node from the first voltage level to a second voltage level. The booster can have variable drive capability that enables varying operation thereof according to at least one degree of freedom (e.g., speed of the booster proceeding to the second voltage level, frequency of yielding charge to the node, the second voltage level, or timing of the booster and the pre-charger, . . . ).

20 Claims, 10 Drawing Sheets

DARK CURRENT AND LAG REDUCTION

BACKGROUND

Recent technological advances have led to complementary metal-oxide-semiconductor (CMOS) sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a System-on-Chip (SoC). As such, the SoC can integrate various components (e.g., analog, digital, . . . ) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems implemented using CMOS imaging sensors can reduce costs, power consumption, and noise while improving resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, . . . ) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for transferring charge from the photodetector to the floating diffusion region and another transistor for resetting the floating diffusion region to a predetermined charge level prior to charge transference. Moreover, three signals can be provided to each pixel cell in the pixel array: a transfer (TX) signal, a reset signal, and a select signal.

The array of pixels cell can operate in a variety of modes. For instance, rolling shutter operation can be utilized to readout a single row of pixels from the pixel array at a particular time. According to another example, a global shutter can be employed to readout all rows (or substantially all rows) of pixels from the array at a given time. To enable readout from the array, conventional techniques oftentimes use a booster to boost signals provided to each pixel in the array; more particularly, the booster can be utilized to increase voltages above Vdd, which is a positive supply voltage, and/or decrease voltages below Ground for transfer signals and/or reset signals provided to pixels in the array. However, commonly employed boosters can lack sufficient speed for reading out pixels from the array when operating in rolling shutter mode or global shutter mode. Conventional boosters can also introduce row-to-row variation of boosted voltage levels. Moreover, typical boosters oftentimes are unable to drive large loads that are commonly encountered when operating in global shutter mode.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate reducing dark current and lag in a CMOS imaging System-on-Chip (iSoC) sensor. For instance, a vertical output driver can output a signal upon a node connected to gates of reset transistors and/or gates of transfer transistors of pixels in the pixel array while operating in rolling shutter mode and/or global shutter mode. Further, a pre-charger can transition a voltage of the node to a first voltage level. Moreover, a booster can further adjust the voltage of the node from the first voltage level to a second voltage level. The booster can have variable drive capability that enables varying operation thereof according to at least one degree of freedom (e.g., speed of the booster proceeding to the second voltage level, frequency of yielding charge to the node, the second voltage level, or timing of the booster and the pre-charger, . . . ).

According to various aspects, the booster can include a plurality of components. For instance, the booster can include a voltage-controlled oscillator (VCO) that outputs clock signals at a frequency set by an inputted current. Further, the booster can comprise a set of charge pumps that can be parallel to each other. A subset of the set of charge pumps can be activated via an enable bus to generate charge outputted upon a boosted node for each of the clock signals. Moreover, the booster can include a resistor divider that generates a feedback voltage as a function of a voltage of the boosted node. Additionally, the booster can comprise a comparator that compares the feedback voltage to a reference voltage (e.g., the reference voltage can be adjustable to tailor a target voltage of the boosted node). The booster can also include an AND gate that enables or inhibits the VCO at a given time based upon output of the comparator and a boost enable signal.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
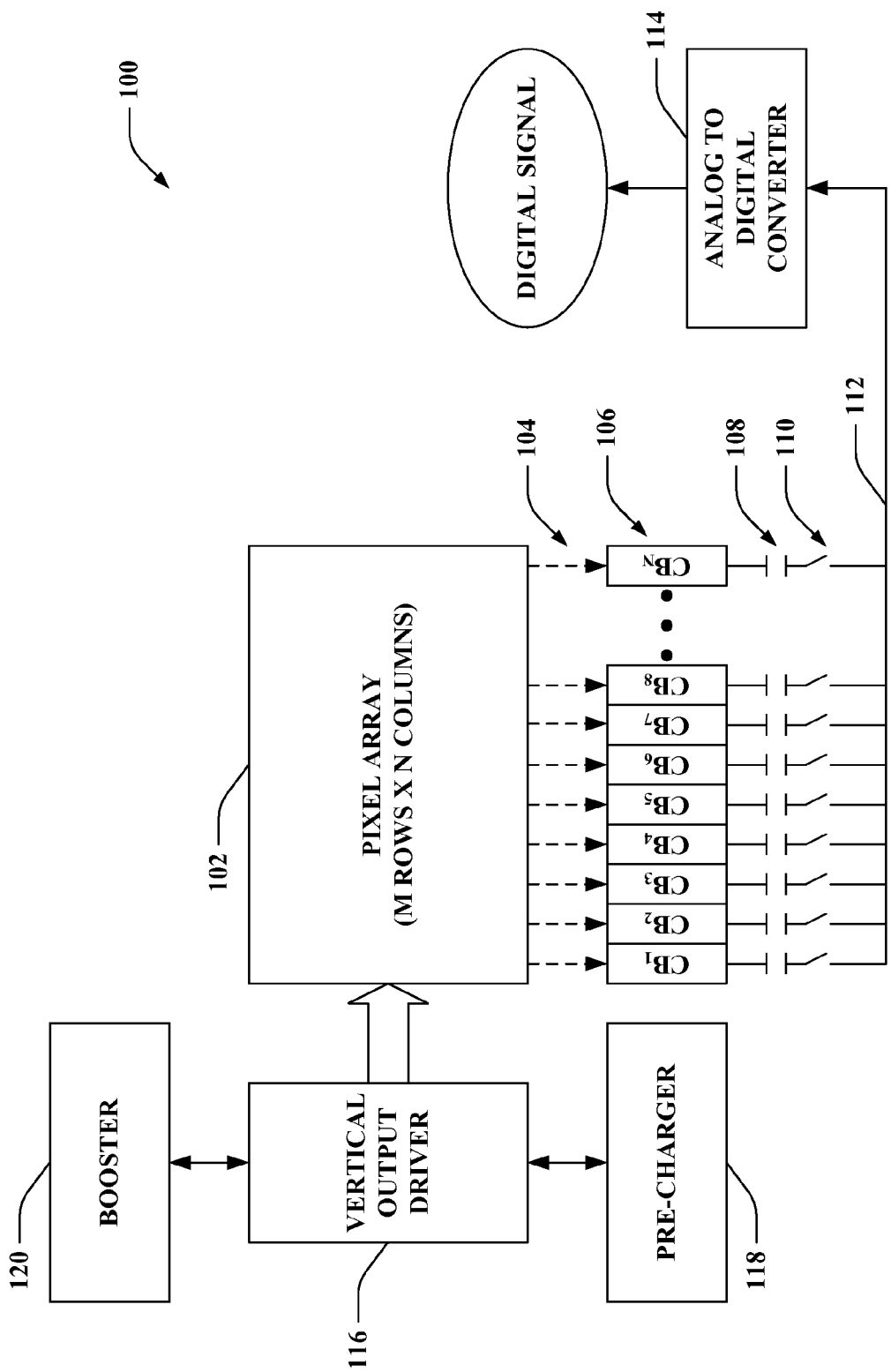
FIG. 1 illustrates an example system that boosts voltage(s) upon bus(es) provided to pixels in a CMOS sensor imager.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that boosts voltage(s) upon bus(es) provided to pixels in a CMOS sensor imager. The system 100 can be associated with a CMOS sensor imager utilized in connection with a camcorder, digital camera, microscope, video system, and/or the like. The system 100 comprises a pixel array 102 that can include M rows and N columns of pixel cells, where M and N can be any integers. Each pixel in the pixel array 102 can comprise a photodetector (e.g., photogate, photoconductor, photodiode, . . . ). Further, each pixel in the pixel array 102 can be utilized to detect a particular color of light; thus, a subset of the pixels in the pixel array 102 can operate in response to red light (R pixels), a disparate subset of the pixels can operate based upon blue light (B pixels) and a further subset of the pixels can operate as a function of green light (G pixels). Other color filter patterns are also possible.

An image focused on the pixel array 102 can cause the pixels to convert incident light into electrical energy. Signals obtained by the pixel array 102 can be processed on a column by column basis; thus, a particular row of pixels from the pixel array 102 can be selected to be read. The system 100 can further include a plurality of read buses 104 that can transfer the contents from the pixels in the pixel array 102 in the selected row. According to an illustration, the system 100 can include N read buses 104, where each read bus 104 can be associated with a respective column of the pixel array 102. By way of further example, pixels in the pixel array 102 can share read buses 104, and thus, the system 100 can include fewer than N read buses 104.

Each read bus 104 can carry content (e.g., sampled signals) from the pixels to a respective column buffer (CB) 106. The system 100 can include N column buffers 106 or fewer, for instance. The column buffers 106 can amplify (e.g., condition) the signals from the pixels. Further, each column buffer 106 can enable low noise readout and can condition the signal from a pixel positioned at one of the rows in the column (or columns) corresponding to the column buffer 106.

After processing by the column buffers 106, outputted values from each of the column buffers 106 can be retained. Moreover, each of the column buffers 106 can be associated with respective circuitry such as, for instance, a respective capacitor 108 and switch 110. Such circuitry can sample and hold outputted values from the corresponding column buffers 106. For example, the capacitors 108 can be loaded with the outputted values from the corresponding column buffers 106. Further, the switches 110 can be closed one at a time to allow for connecting to a bus 112; thus, the voltages generated by the column buffers 106 can be multiplexed over the bus 112. The bus 112 can enable communicating each of the outputted values from the respective column buffers 106 to an analog to digital converter (ADC) 114. The ADC 114 can digitize the sampled signal to yield a digital signal. The digital signal can thereafter be provided to disparate component(s) (not shown) for further processing, manipulation, storage, display, and so forth.

The system 100 can also include a vertical output driver 116, a pre-charger 118 and a booster 120. Although not shown, it is also contemplated that each row of the pixel array 102 or each signal (e.g., each signal to be boosted and thereafter communicated to pixels, . . . ) in each row of the pixel array 102 can be associated with a respective vertical output driver, pre-charger and/or booster, each of which can be substantially similar to the vertical output driver 116, the pre-charger 118, and the booster 120 as described herein.

The vertical output driver 116 can be an output stage of a vertical scanner (not shown). The vertical output driver 116 can output voltage(s) (e.g., signal(s)) to gates of various transistors of pixels included the pixel array 102. By way of illustration, the vertical output driver 116 can provide an output voltage to one or more buses (e.g., one or more nodes, ...) that can connect to gates of reset transistors, gates of transfer transistors, and/or gates of select transistors and other signals that may be present in other kinds of pixel architectures; thus, the vertical output driver 116 can generate a reset signal that is provided to reset transistors of pixels, a transfer signal that is provided to transfer transistors of pixels, and/or a select signal that is provided to select transistors of pixels. For instance, the vertical output driver 116 can output a high voltage level (e.g., Vdd) or a low voltage level (e.g., Ground) to the one or more buses. Moreover, the signals provided to the pixels of the pixel array 102 by the vertical output driver 116 can be boosted above Vdd and/or boosted below Ground; for instance, the reset signal(s) and the transfer signal(s) can be boosted, while the select signal(s) may not need to be boosted.

The pre-charger 118 can pre-charge the signal to be outputted upon a bus by the vertical output driver 116; by pre-charging, the signal can be transitioned to a high voltage level or a low voltage level. More particularly, the pre-charger 118 can pre-charge the signals for the entire pixel array 102 or a portion thereof. For instance, the pre-charger 118 can pre-charge all rows of the pixel array 102 when operating in a global shutter mode. According to another example, the pre-charger 118 can pre-charge a subset of rows out of the M rows of the pixel array 102 at a given time (e.g., one row, two rows, etc. at a particular time) while in rolling shutter mode. The pre-charger 118 can be tied to supply voltages, and thus, the pre-charger 118 can provide a large amount of current to the bus being pre-charged; providing this large amount of current enables the output provided to the gates of the reset transistors and/or the transfer transistors to quickly transition between states (e.g., quickly switch from the high voltage level to the low voltage level and/or quickly switch from the low voltage level to the high voltage level, where the high voltage level can be Vdd and the low voltage level can be Ground, ...). By way of further illustration, the output provided to the gates of the reset transistors and/or the gates of the transfer transistors can quickly transition from a boosted voltage level above the high voltage level to the low voltage level and/or from a boosted voltage level below the low voltage level to the high voltage level. Although shown as utilizing a common pre-charger 118 for positive and negative boosting, it is to be appreciated that separate pre-chargers can be employed for positive boosting and negative boosting. Further, the pre-charger 118 can be connected to the vertical output driver 116 (and/or a bus) in a manner that mitigates substrate current. Pursuant to another example, the pre-charger 118 can be a distributed device that provides increased width to enable handling pre-charge of the entire pixel array 102.

Moreover, the booster 120 can further increase the high voltage level or decrease the low voltage level yielded by the pre-charger 118 to reach a target voltage level at a given time. Thus, the booster 120 can provide positive boosting whereby the voltage is raised above the high voltage level to the target voltage level. Further, the booster 120 can yield negative boosting where the voltage is lowered below the low voltage level to the target voltage level. Positive boosting can be employed for the transfer signal and the reset signal, while negative boosting can be utilized for the transfer signal only.

The booster 120 can have variable drive capability; thus, operation of the booster 120 can vary according to various degrees of freedom (e.g., speed of the booster 120 proceeding to a target voltage, frequency of yielding charge to a boosted node, target voltage, timing of the booster 120 along with timing of disparate components such as the pre-charger 118, ...). For instance, a step size employed by the booster 120 can be adjustable based upon a number of capacitors utilized. Further, a speed of the booster 120 can be adjustable as a function of bias current; thus, the booster 120 can be sped up by increasing the bias current or slowed down by decreasing the bias current. Additionally, the booster 120 can be disabled with timing to save power and/or noise when the booster 120 is not being used. Moreover, the booster 120 can include a comparator to disable the booster 120 when the target voltage level is reached, which can provide consistent boosting voltage to all (or substantially all) rows of the pixel array 102. In contrast, conventional techniques that provide non-uniform boosting can lead to Fixed Pattern Noise (FPN) or row noise issues.

According to an illustration, the vertical output driver 116 can quickly transition from yielding an output with a voltage below Ground (e.g., V_Boost_negative) to yielding an output with a voltage above Vdd (e.g., the output voltage provided by the vertical output driver 116 upon a bus can be V_Boost_positive, which is greater than Vdd). Upon switching, the pre-charger 118 can quickly raise the voltage of the output to Vdd from V_Boost_negative. The pre-charger 118, rather than the booster 120, can be utilized to increase the voltage of the output initially, since the booster 120 may be unable to supply sufficient current during switching (e.g., global switching, ...). After this initial voltage increase, the pre-charger 118 can be turned to an off state and the booster 120 can be employed to further raise the voltage from Vdd to V_Boost_positive. For instance, the booster 120 can be transitioned from an off state to an on state to raise the voltage from Vdd to V_Boost_positive; this can enable conserving power and/or mitigating noise. Alternatively, the booster 120 can be in the on state while the pre-charger 118 raises the voltage to Vdd, and thus, the booster 120 can remain in the on state after the pre-charger 118 switches to the off state. Moreover, the system 100 can similarly transition the outputted voltage to a voltage level boosted below a low voltage level (e.g., to V_Boost_negative). Further, it is to be appreciated that the claimed subject matter is not limited to the aforementioned illustration, as transitioning between outputted voltage levels can start at any voltage level, proceed to any intermediate voltage level at which the pre-charger 118 is disengaged, and/or continue to any boosted voltage level.

Utilization of the system 100 addresses various challenges commonly encountered by conventional boosting techniques when employing global shutter operation and/or rolling shutter operation. For instance, for global shutter mode, the system 100 enhances speed of the booster 120, allows transfer gate voltage to range from above Vdd to below Ground (e.g., 5.0 V to −2.0 V, ...), prevents substrate current from flowing, and controls timing of the booster 120. According to a further example, for rolling shutter mode, the system 100 enhances speed and power of the booster 120, controls step size yielded by the booster 120 to provide uniform operation for all rows of the pixel array 102, enhances long term device reliability for transistors connected to boosted nodes, and controls timing, rise and fall times, etc. of the booster 120. It is to be appreciated, however, that the claimed subject matter is not limited to the aforementioned.

Figure 2:
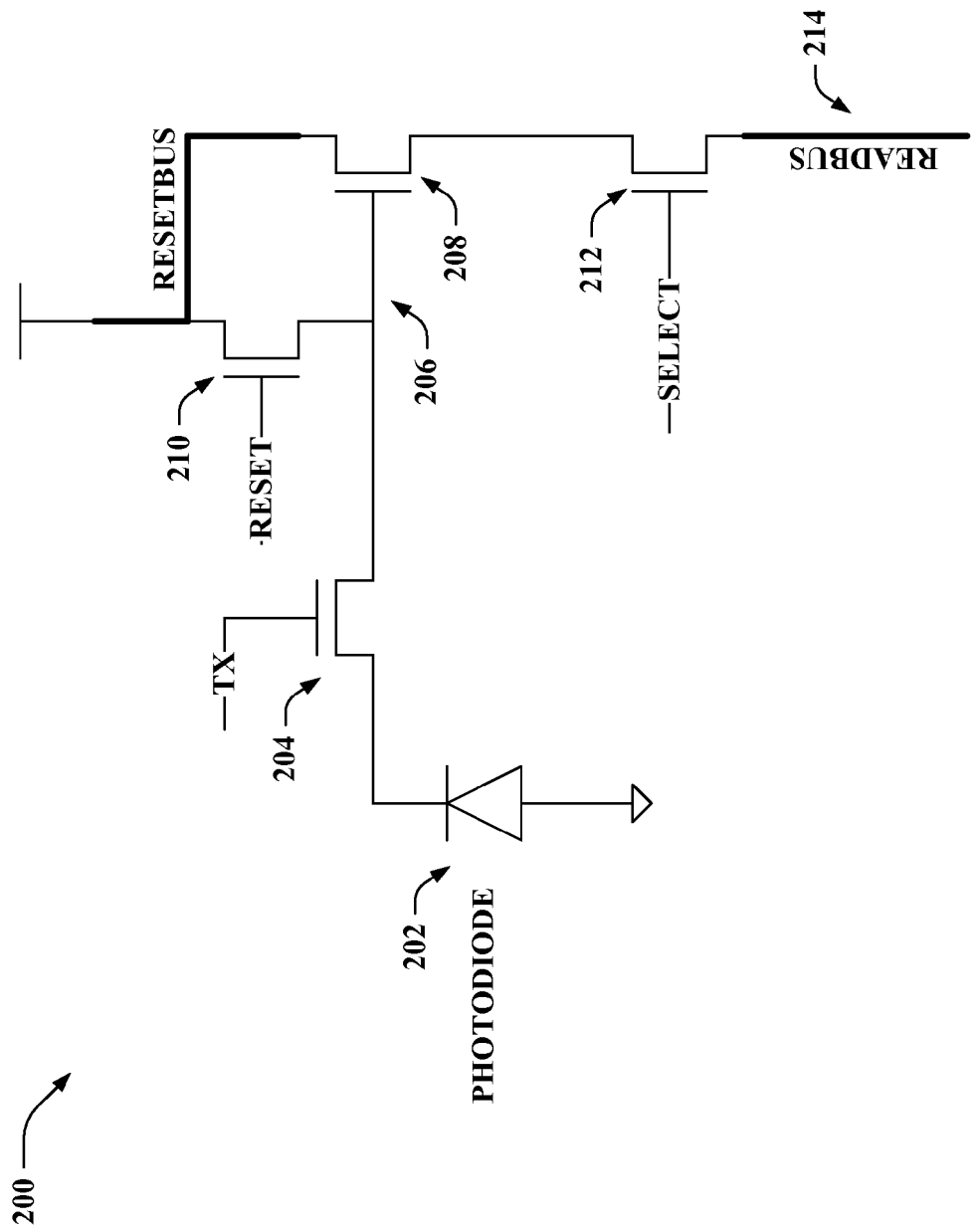
FIG. 2 illustrates an example CMOS imager pixel cell that can be included in a pixel array.

Now turning to FIG. 2, illustrated is an example CMOS imager pixel cell 200 that can be included in a pixel array (e.g., the pixel array 102 of FIG. 1). The pixel cell 200 includes a photodiode 202 connected to a transfer transistor 204. The transfer transistor 204 is further connected to a floating diffusion region 206. The floating diffusion region 206 connects to a source follower transistor 208 and a reset transistor 210. The source follower transistor 208 is further connected to a select transistor 212. The select transistor 212 can be employed to select a particular row of pixel cells from a pixel array.

The photodiode 202 can be charged by converting optical energy to electrical energy. For instance, the photodiode 202 can have sensitivity to a particular type of incident light (e.g., red light, blue light, green light). Moreover, the type of light to which the photodiode 202 is sensitive can indicate a type of the pixel cell 200 (e.g., R pixel, B pixel, G pixel). Light can be integrated at the photodiode 202 and electrons generated from the light can be transferred to the floating diffusion region 206 (e.g., in a noiseless or substantially noiseless manner) when a transfer signal (TX) is received at a gate of the transfer transistor 204. Thus, until reception of the TX, the light can be integrated.

According to an illustration, the floating diffusion region 206 can be reset to a known state before transfer of charge thereto. Resetting of the floating diffusion region 206 can be effectuated by the reset transistor 210. The reset transistor 210 can reset the floating diffusion region 206 to a reset voltage provided by a reset bus upon receiving a reset signal at the gate of the reset transistor 210. Further, the transfer transistor 204 can transfer charge (e.g., yielded by the photodiode 202) to the floating diffusion region 206. The charge can be transferred in response to a transfer signal (TX) received at a gate of the transfer transistor 204. Moreover, the pixel cell 200 (along with other pixel cell(s) in the same row of the pixel array) can be selected for readout by employing the select transistor 212. Readout can be effectuated via a read bus 214 (e.g., one of the read buses 104 of FIG. 1). Further, the source follower transistor 208 can output and/or amplify a signal representing a reset voltage (e.g., provided via a reset bus) and a pixel signal voltage based on the photo converted charges.

The transfer signal and the reset signal can be boosted signals. More particularly, the transfer signal can be positively boosted above a high voltage level (e.g. boosted above Vdd to V_Boost_positive, . . . ) and negatively boosted below a low voltage level (e.g., boosted below Ground to V_Boost_negative, . . . ), while the reset signal can be positively boosted above a high voltage level (e.g., boosted above Vdd to V_Boost_positive, . . . ).

The reset signal can be positively boosted to enable resetting the floating diffusion region 206 to a highest possible voltage (e.g., reset voltage, voltage approaching or equal to Vdd, . . . ). The charge collected by the photodiode 202 can thereafter be transferred via the transfer transistor 204 to the floating diffusion region 206, where this charge decreases the voltage at the floating diffusion region 206. Thus, increasing the reset voltage level of the floating diffusion region 206 can maximize a range over which the floating diffusion region 206 operates. According to a further illustration, the reset transistor 210 can be a NMOS transistor. Following this illustration, a source of the reset transistor 210 can be connected to the reset bus, which can be at a voltage equal to Vdd. A drain of the reset transistor 210 can be connected to the floating diffusion region 206. Thus, to enable the floating diffusion region 206 to go to Vdd, the gate of the reset transistor 210 can be overdriven by at least a threshold voltage (Vt). Hence, the reset signal can be equal to at least Vdd+Vt. For example, Vdd can be 3.3 V and Vt can be 1.0 V, and therefore, the reset signal can be positively boosted to at least 4.3 V (e.g., pre-charged to 3.3 V and then positively boosted from 3.3 V to 4.3 V, . . . ); however, it is to be appreciated that the claimed subject matter is not so limited since any voltage can be utilized for Vdd and/or Vt.

Further, the transfer signal can be negatively boosted (e.g., below Ground) to mitigate dark current at the transfer transistor 204, which reduces charge transference from the output of the photodiode 202 to the floating diffusion region 206 while the transfer transistor 204 is in an off state. For instance, when the transfer signal is more negative, the transfer transistor 204 turns more to the off state. According to an example, the transfer signal can be negatively boosted to −2.0 V (e.g., pre-charged to Ground and then negatively boosted from Ground to −2.0 V, . . . ); however, the claimed subject matter is not so limited. Yet, the substrate typically is to be most negative; thus, a triple well can be utilized to create isolation between the circuits driving the transfer transistor 204 and the substrate.

Moreover, the transfer signal can be positively boosted (e.g., above Vdd) to reduce lag, which can result when charge fails to be fully transferred from the output of the photodiode 202 to the floating diffusion region 206. To mitigate charge yielded by the photodiode 202 from failing to be transferred to the floating diffusion region 206, the transfer transistor 204 can be provided a transfer signal that is overdriven above a high voltage level (e.g., boosted above Vdd to V_Boost_positive), which can lower the potential barrier between the two sides of the gate of the transfer transistor 204 to enhance flowing of the charge. For example, the transfer signal can be boosted by 0.5 V, 1.0 V, etc. above Vdd; however, the claimed subject matter is not so limited. In contrast, conventional techniques that fail to boost the voltage level of the transfer signal can yield incomplete transfer of charge to the floating diffusion region 206. This incomplete transfer, or lag, can result in charge remaining at the output of the photodiode 202, which can introduce noise into a subsequent sample.

Figure 3:
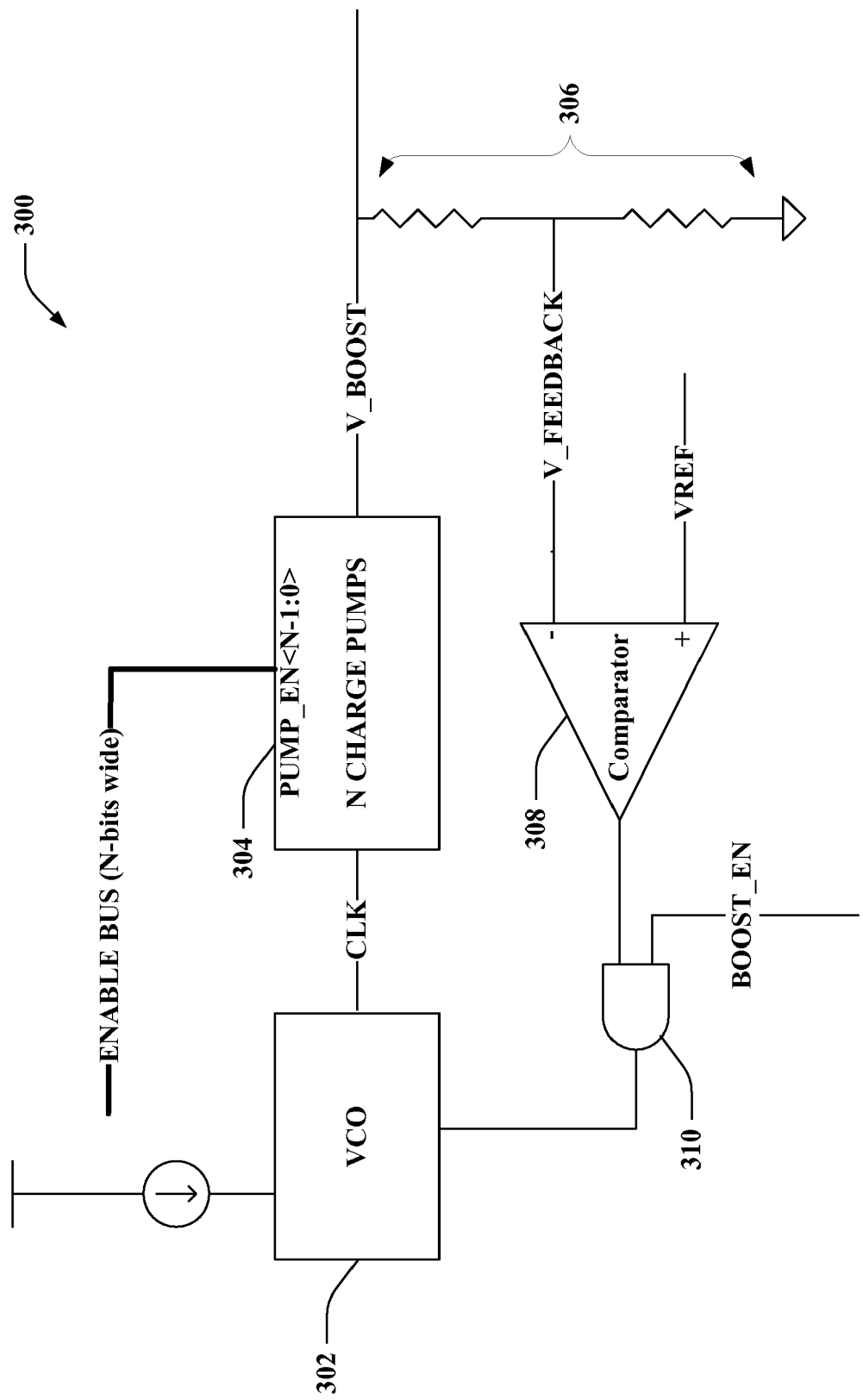
FIG. 3 illustrates an example system that positively and/or negatively boosts a signal for utilization with a CMOS sensor imager.

Now referring to FIG. 3, illustrated is system 300 that positively and/or negatively boosts a signal for utilization with a CMOS sensor imager. The system 300 can be a booster such as, for instance, the booster 120 of FIG. 1. The output from the system 300 can be V_boost, which can be the positively boosted or negatively boosted voltage (e.g., voltage boosted above Vdd, which can be referred to as V_Boost_positive, or voltage boosted below Ground, which can be referred to as V_Boost_negative) provided at an output node (e.g., which can be a bus, . . . ). Moreover, the system 300 can include a voltage-controlled oscillator (VCO) 302, N charge pumps 304 where N can be substantially any integer, a resistor divider 306, a comparator 308, and an AND gate 310.

The VCO 302 can be an electronic oscillator where an oscillation frequency (e.g., speed, . . . ) of the VCO 302 can be controlled. For example, a current (e.g., bias current) inputted to the VCO 302 can set the speed of the VCO 302, and hence, the speed of the booster (e.g., the system 300) in general. Further, the speed of the VCO 302 can be set over a wide range to allow for optimization of speed (e.g., rise/fall time of the booster) and power. According to an illustration, the frequency of the VCO 302 can range to 400 MHz; however, it is to be appreciated that the claimed subject matter is not so limited. The VCO 302 can output clock signals (CLK), which can be inputted to the N charge pumps 304. Hence, the frequency to which the VCO 302 is set can determine a frequency of an occurrence of charge transfer from the booster to a node (e.g., bus, . . . ) connected to the pixel array.

The system 300 can include N charge pumps 304, and it is to be appreciated that N can be substantially any integer. Further, the number of charge pumps 304 utilized at a given time is not fixed. Thus, a subset or all of the N charge pumps 304 can be activated for operation at a particular time, while a remainder of the N charge pumps 304 can be deactivated at the particular time. The number of charge pumps 304 employed at a given time can be based upon a signal received via an enable bus. This signal can be N-bits wide and can indicate a number of the N available charge pumps 304 to enable (e.g., activate) at the given time. The N charge pumps 304 can be in parallel to each other. Further, the N charge pumps 304 can generate a voltage of V_boost as an output.

According to an illustration, in rolling shutter mode, a small number of charge pumps 304 can be used to minimize the step size of the booster. A small step size can reduce row-to-row variation of the boosted voltage level as the comparator 308 can turn the system 300 off (e.g., via disabling the VCO 302) at a substantially similar level for all rows. This can minimize a potential for row noise and fixed pattern noise (FPN) issues. A smaller number of active charge pumps 304 can also reduce power supply spikes (e.g., noise, . . . ).

By way of another example, in global shutter mode, the load of the booster (e.g., the load of the system 300) can be an entire pixel array (e.g., the pixel array 102 of FIG. 1); for instance, the load of the entire pixel array can be on the order of a few nF to a few 10's of nF (e.g., 12 million pixels in the pixel array can be associated with a load around 50 nF, . . . ). Thus, a large number of charge pumps 304 can be activated and utilized to maximize the speed of the booster during global shutter operations. For global boosting operations, the step size can automatically be small since the load capacitance can be much larger (e.g., 100-1000 times larger) when associated with the entire array rather than a single row.

The resistor divider 306 can include two resistors. Further, these resistors can provide large resistances to limit current; however, the claimed subject matter is not so limited. The resistor divider 306 is used to feedback the boost voltage (e.g., V_boost) to the comparator 308. This feedback voltage can be referred to as V_feedback, which can be the boost voltage times a ratio of resistances from the resistor divider 306.

The comparator 308 is a device that compares two voltages and switches its output to indicate which is larger. More particularly, the comparator 308 compares V_feedback to a reference voltage (e.g., V_ref). The comparator 308 output can be switched to a low state, which disables the VCO 302, when the feedback voltage is greater than the reference voltage (e.g., V_feedback is larger than V_ref) when raising the voltage to V_Boost_positive. Further, the output from the comparator 308 can be switched to a high state to enable the VCO 302 upon the reference voltage being greater than the feedback voltage. According to another illustration, when lowering the voltage to V_Boost_negative, the comparator 308 output from the comparator 308 can be switched to a low state to disable VCO 302 upon the feedback voltage being less than the reference voltage (e.g., V_feedback is less than V_ref). Additionally, when lowering the voltage to V_Boost_negative, the output from the comparator 308 can be in a high state to enable the VCO 302 upon the reference voltage being less than the feedback voltage. Moreover, the reference voltage (e.g., V_ref) can be adjustable (e.g., using a digital to analog converter (DAC), . . . ) to achieve an adjustable V_boost voltage.

Moreover, the comparator 308 can be coupled to the AND gate 310. The AND gate 310 can yield a high state output when both inputs to the AND gate 310 are in high states. Thus, when the comparator 308 yields a high state output (e.g., when the reference voltage is greater than the feedback voltage) and a boost enable signal (e.g., Boost_en) inputted to the AND gate 310 is in a high state, the AND gate 310 can yield an output that activates the VCO 302. Otherwise, if either or both of the inputs to the AND gate 310 are in a low state, the AND gate 310 inhibits operation of the VCO 302 (e.g., as well as the system 300 in general). Thus, Boost_en controls when the booster (e.g., the system 300) is in an on state. For instance, Boost_en allows for controllability of when during a line and/or frame the charge pump(s) 304 are active. This can be useful in saving power and reducing noise. Also, the exposure of devices connected to the boosted voltage levels can be minimized to maximize device reliability.

Figure 4:
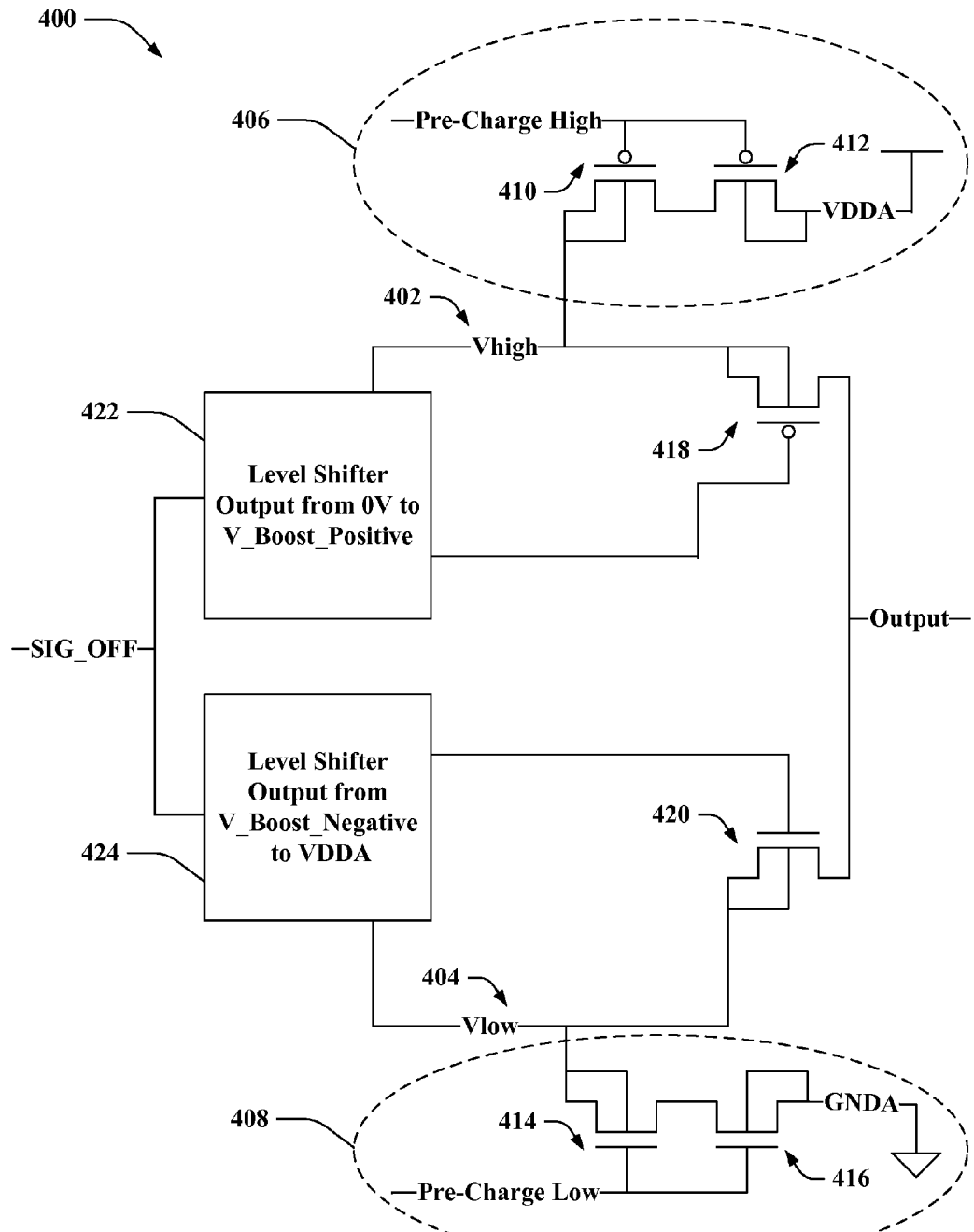
FIG. 4 illustrates an example system that generates output signals provided to gates of transfer transistors and/or reset transistors of pixels in a pixel array of a CMOS sensor imager.

Now referring to FIG. 4, illustrated is a system 400 that generates output signals provided to gates of transfer transistors and/or reset transistors of pixels in a pixel array of a CMOS sensor imager. The system 400 is an example of an output stage of a vertical scanner that allows for output voltages above and below the normal supply levels. For instance, there can be an output stage similar to the system 400 for each row in a pixel array (e.g., the pixel array 102 of FIG. 1) and for each signal in each row that is to be driven with levels outside the supply range of Ground to Vdd. Further, the system 400 can be the vertical output driver 116 and pre-charger 118 of FIG. 1.

The system 400 includes a Vhigh bus 402 and a Vlow bus 404, which are buses that run the length of the vertical scanner and are shared for all rows in the vertical scanner. A high pre-charge circuit 406 (e.g., the pre-charger 118 of FIG. 1, . . . ) can be coupled to the Vhigh bus 402, while a low pre-charge circuit 408 (e.g., the pre-charger 118 of FIG. 1, . . . ) can be coupled to the Vlow bus 404. The high pre-charge circuit 406 can include two PMOS transistors (e.g., PMOS transistor 410 and PMOS transistor 412) while the low pre-charge circuit 408 can include two NMOS transistors (e.g., NMOS transistor 414 and NMOS transistor 416). Further, the Vhigh bus 402 can be coupled to a PMOS transistor 418 and the Vlow bus 404 can be coupled to an NMOS transistor 420. Moreover, the NMOS transistors 414, 416, 420 can be triple well devices to enable lowering a voltage upon the Vlow bus 404 below Ground (e.g., lower than −0.7 V, . . . ). Additionally, device reliability for transistors connected to boosted nodes can be improved by increasing device length and minimizing the exposure (e.g., duty cycle) of the devices to voltage levels outside of the normal supply range.

The high pre-charge circuit 406 can bring the Vhigh bus 402 to a level of Vdd volts. For instance, when booster speed and/or current are inadequate (e.g., when employing global shutter operation), a pre-charge high signal can be used to initially bring the Vhigh bus 402 to a level of Vdd volts (e.g., VDDA, . . . ). Accordingly, a booster (e.g., the booster 120 of FIG. 1, the system 300 of FIG. 3, can begin boosting from Vdd volts instead of from V_Boost_negative volts, which allows the booster to reach a positive target voltage level (e.g., V_Boost_positive) faster since it starts from a voltage level closer to the positive target voltage level.

Utilization of the high pre-charge circuit 406 to pre-charge the Vhigh bus 402 can be employed for global shutter operation; however, it is also contemplated that pre-charging can be employed when using rolling shutter mode. As such, this pre-charging can provide power to a positive booster level shifter 422 during switching. In contrast, without pre-charging, the Vhigh bus 402 can collapse when global switching is attempted since the booster may not be able to provide the current necessary to switch the entire array at the same time.

The low pre-charge circuit 408 can bring the Vlow bus 404 to a level of Ground volts. For example, when booster speed is inadequate (e.g., when employing global shutter operation), a pre-charge low signal can be utilized to initially bring the Vlow bus 404 to a level of Ground volts (e.g., GNDA, . . . ). Hence, the booster can initiate boosting from Ground volts instead of from V_Boost_positive volts, which allows the booster to reach a negative target voltage level (e.g., V_Boost negative) faster since it starts from a voltage level closer to the negative target voltage level.

The low pre-charge circuit 408 can be employed to pre-charge the Vlow bus 404 during global shutter operation; yet, it is also contemplated that pre-charging can be used for rolling shutter operation. This pre-charging can provide power to a negative booster level shifter 424 during switching. On the contrary, without pre-charging, the Vlow bus 404 can collapse when global switching is attempted since the booster may not be able to provide the current necessary to switch the entire array at the same time.

The input to the positive booster level shifter 422 and the negative booster level shifter 424 is a SIG_OFF signal. When the SIG_OFF signal is at a high state, the output can go to a low state, and vice versa. Further, the positive booster level shifter 422 can be a level shifter powered from V_Boost_positive so that output high level can equal V_Boost_positive and Ground. Accordingly, this can turn off the PMOS switch (e.g., the PMOS transistor 418) that controls the output. Moreover, the negative booster level shifter 424 can be a level shifter powered from V_Boost_negative and Vdd so that the output low level can equal V_Boost_positive. Hence, this can be utilized to turn off the NMOS switch (e.g., the NMOS transistor 420) that controls the output.

Moreover, it is to be appreciated that it may not be necessary to have pre-charge switches in each row; rather, a switch that can conduct current for the pre-charging of the entire pixel array during global operation can be utilized. This current can be on the order of hundreds of milliamps to a few amps for the switching transient, for example. According to another illustration, instead of having one very large transistor, it can be convenient to have a small pre-charge switch in every row, or in every few rows, to achieve the final size needed.

Additionally, the high pre-charge circuit 406 and the low pre-charge circuit 408 can each have body connections to mitigate current flow through bodies of devices under various conditions. For instance, the high pre-charge circuit 406 can employ body connections that mitigate current flowing through the bodies of the devices if Vhigh falls below Vdd. Moreover, the low pre-charge circuit 408 can utilize body connections that mitigate current flowing through the bodies of the devices if Vlow rises above Ground.

Figure 5:
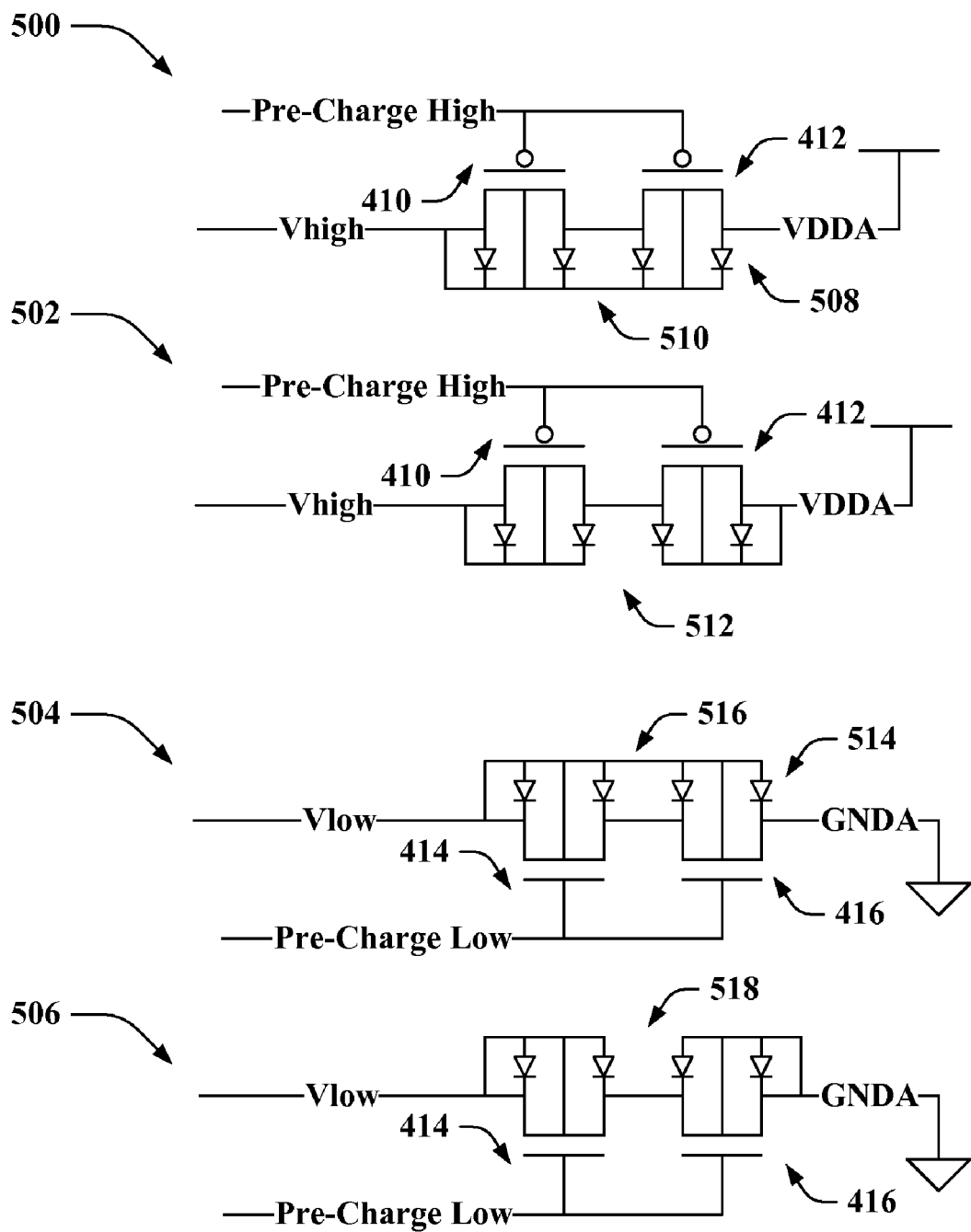
FIG. 5 illustrates example diagrams depicting body connections of pre-charge devices in accordance with various aspects of the claimed subject matter.

Now turning to FIG. 5, illustrated are example diagrams depicting body connections of pre-charge devices. Either pre-charge device 500 or pre-charge device 502 can be the high pre-charge circuit 406 of FIG. 4; the pre-charge device 500 and the pre-charge device 502 can each include the PMOS transistors 410 and 412. Similarly, pre-charge device 504 or pre-charge device 506 can be the low pre-charge circuit 408 of FIG. 4, where the pre-charge device 504 and the pre-charge device 506 can each include the NMOS transistors 414 and 416. By way of illustration, implications of body connections utilized in the pre-charge device 500 are contrasted with implications of body connections employed for the pre-charge device 502, and implications of body connections used with the pre-charge device 504 are compared to implications of body connections leveraged by the pre-charge device 506. However, it is to be appreciated that the claimed subject matter is not limited to the depicted examples.

Body connections of the pre-charge device 500 can result in large amounts of well current flow, which can be undesirable. More particularly, if Vhigh, which is the n-well potential, goes below Vdd, a diode 508 between Vdd and the well formed by the source of the PMOS will turn on causing large amounts of well current to flow. This can damage the device and is undesirable since when the pre-charge device 500 is in the off (e.g., high) state, no connection should exist between Vdd and Vhigh. In contrast, the pre-charge device 502 can isolate Vdd and Vhigh when the pre-charge device 502 is in the off (e.g., high) state. For the pre-charge device 502, if Vhigh goes below Vdd, no substrate current can flow since the n-wells of the two PMOS transistors 410 and 412 are isolated (e.g., as shown at 512 in contrast to a connection 510 between the n-wells of the PMOS transistors 410 and 412 in the pre-charge device 500). Thus, risk of device damage due to well current flow when the pre-charge device 502 is in the off state can be mitigated. Accordingly, the pre-charge device 502 can be utilized in connection with the system 400 of FIG. 4 (e.g., rather than the pre-charge device 500).

Moreover, pre-charge device 506 can be employed in connection with the system 400 of FIG. 4 instead of the pre-charge device 504. For instance, with the pre-charge device 504, if Vlow, which is the p-well potential, goes above Ground, a diode 514 between Ground and the well (e.g., Vlow) formed by the source of the triple well NMOS can turn on causing large amounts of well current to flow. This can damage the device and is undesirable since when the pre-charge device 504 is in the off (e.g., low) state, no connection should exist between Ground and Vlow. On the contrary, the pre-charge device 506 can isolate Ground and Vlow when the pre-charge device 506 is in the off (e.g., low) state. For the pre-charge device 506, if Vlow goes above Ground, no substrate current can flow since the p-wells of the two NMOS transistors 414 and 416 are isolated (e.g., as shown at 518 in contrast to a connection 516 between the p-wells of the NMOS transistors 414 and 416 in the pre-charge device 504). Hence, risk of device damage resulting from well current flow when the pre-charge device 506 is in the off state can be mitigated, and thus, the pre-charge device 506 can be leveraged in connection with the system 400 of FIG. 4 (e.g., rather than the pre-charge device 504).

Figure 6:
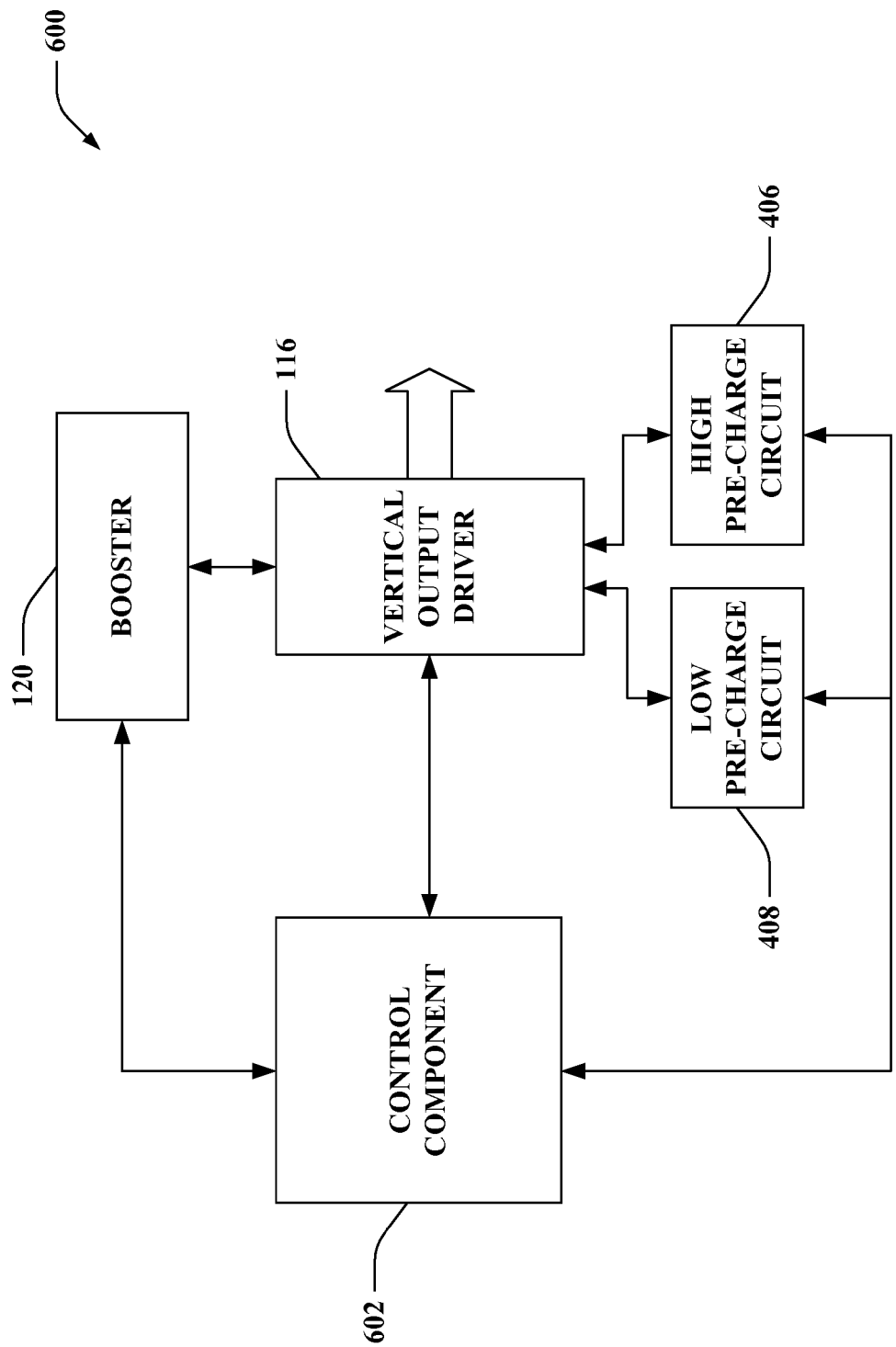
FIG. 6 illustrates an example system that controls voltage boosting in a CMOS sensor imager.

Now referring to FIG. 6, illustrated is a system 600 that controls voltage boosting in a CMOS sensor imager. The system 600 includes the vertical output driver 116 that can yield a signal upon a bus that can be provided to pixels in a pixel array (e.g., the pixel array 102 of FIG. 1). Further, the system 600 includes the high pre-charge circuit 406, the low pre-charge circuit 408, and the booster 120 as described herein. Moreover, the system 600 includes a control component 602 that can control operation of the vertical output driver 116, the high pre-charge circuit 406, the low pre-charge circuit 408, and/or the booster 120. For instance, the control component 602 can coordinate operations effectuated by the vertical output driver 116, the high pre-charge circuit 406, the low pre-charge circuit 408, and/or the booster 120.

According to an illustration, the control component 602 can be a read state machine that yields signals to transition between on and off states. For instance, the control component 602 can include a pattern generator (not shown) that initiates transfer of these signals via a pattern. The pattern can be predefined (e.g., the pattern can be retained in memory and/or instructions to generate the pattern can be retained in memory), generated based upon feedback, initialized by a user, and so forth. As an example of a signal that can be yielded, the control component 602 can provide a Boost_en signal to the booster 120 that switches the booster 120 on or off. Thus, the control component can disable and enable the booster 120 based upon timing communicated via the Boost_en signal. Further, the control component 602 can provide a pre-charge high signal to the high pre-charge circuit 406 and/or a pre-charge low signal to the low pre-charge circuit 408 to change on/off states of the high pre-charge circuit 406 and the low pre-charge circuit 408, respectively. Moreover, the control component 602 can output a SIG_OFF signal for the vertical output driver 116 as described herein. It is to be appreciated that the forgoing signals yielded by the control component 602 are provided for illustration purposes, and the claimed subject matter is not so limited since the control component 602 can coordinate operation of the system 600 via generating any disparate signal(s) in addition to or instead of the aforementioned examples.

Pursuant to a further example, the control component 602 can control operation of the booster 120. For instance, the control component 602 can control a number of charge pumps (e.g., the charge pumps 304 of FIG. 3) to activate for yielding a boosted voltage (e.g., via sending a signal via an enable bus to the booster 120) at a given time. Thus, the amount of charge dumped upon a boosted node (e.g., bus) per clock cycle can be controlled (e.g., more charge pumps can yield more charge per cycle, less charge pumps can generate less charge per cycle, Following this example, the control component 602 can evaluate a performance metric to alter the number of activated charge pumps out of a set of available charge pumps. Moreover, the control component 602 can control the frequency of a VCO (e.g., the VCO 302 of FIG. 3) via adjusting the current inputted to the VCO of the booster 120. Changing the frequency of the VCO can managed the frequency of how often charge is dumped onto the boosted node. According to another illustration, the control component 602 can manipulate a value of a reference voltage (e.g., V_ref) utilized by the booster 120. The reference voltage can be compared (e.g., via the comparator 308 of FIG. 3) to feedback voltage (e.g., V_feedback), where the feedback voltage can be outputted from a resistor divider (e.g., the resistor divider 306 of FIG. 3) that has the boosted voltage (e.g., V_Boost) as its input. Further, the control component 602 can control timing of the booster 120 (as well as timing associated with the system 600 in general). In contrast, conventional boosters oftentimes provide crude control capabilities such as being able to adjust an initial voltage level without being able to handle voltage level decay, variation in voltage level, and the like, which the booster 120 can enable.

Further, the control component 602 can include and/or be coupled to a data store (not shown). For instance, the data store can retain the pattern utilized by the control component 602 for coordination of operations. Further, the data store can retain instructions for generating such pattern and/or altering operation of the booster 120; by way of example, the data store can include metrics for evaluating feedback associated with the booster 120, which can be utilized by the control component 602 to vary the number of active charge pumps, the speed of the VCO, the reference voltage, and/or the timing of the booster 120 (as well as the system 600 in general). Moreover, the data store can retain instructions for obtaining user input which can be leveraged (e.g., by the control component 602) to control the booster 120. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Figure 7:
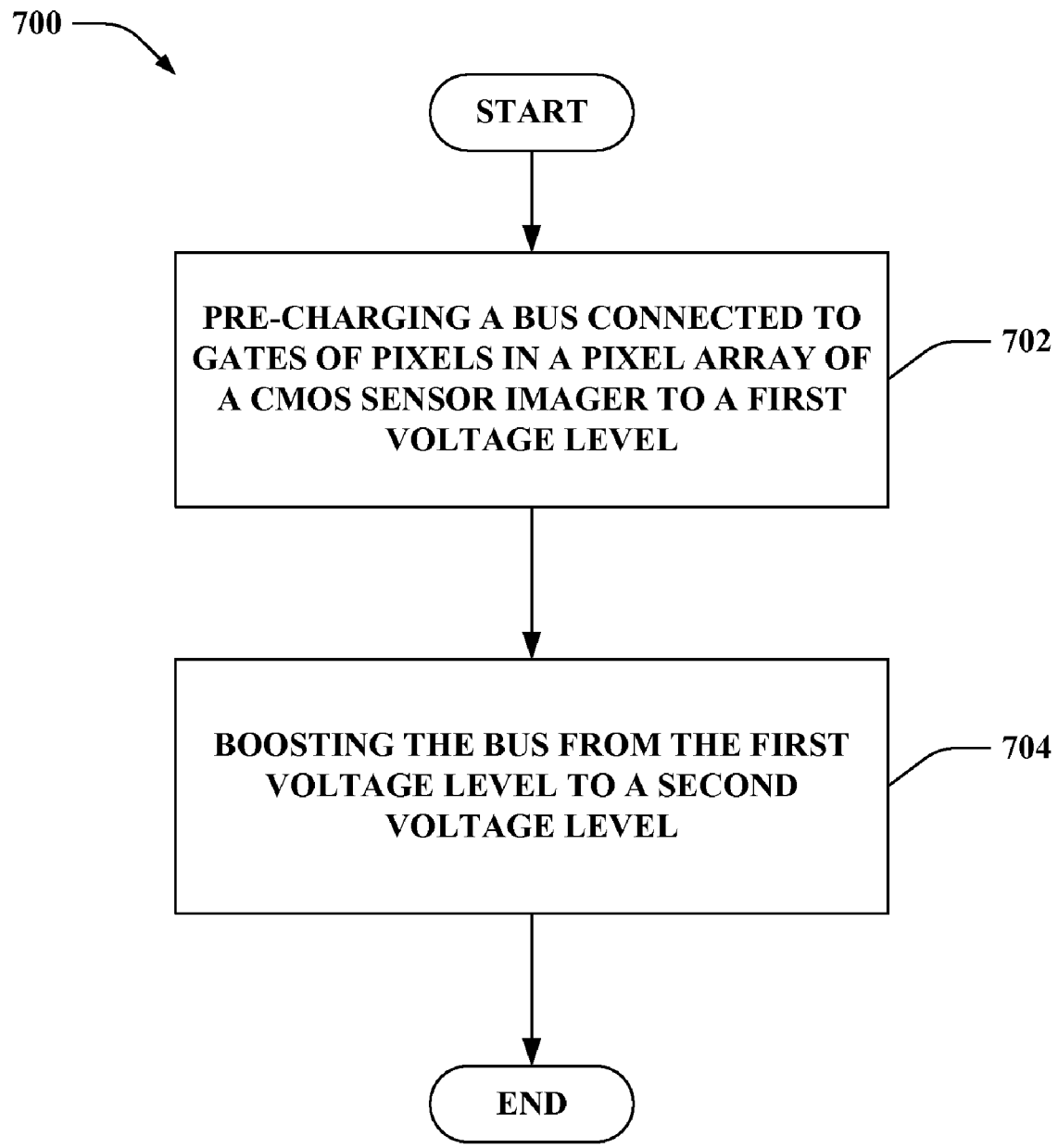
FIG. 7 illustrates an example methodology that facilitates reducing lag and dark current in a CMOS sensor imager.
Figure 8:
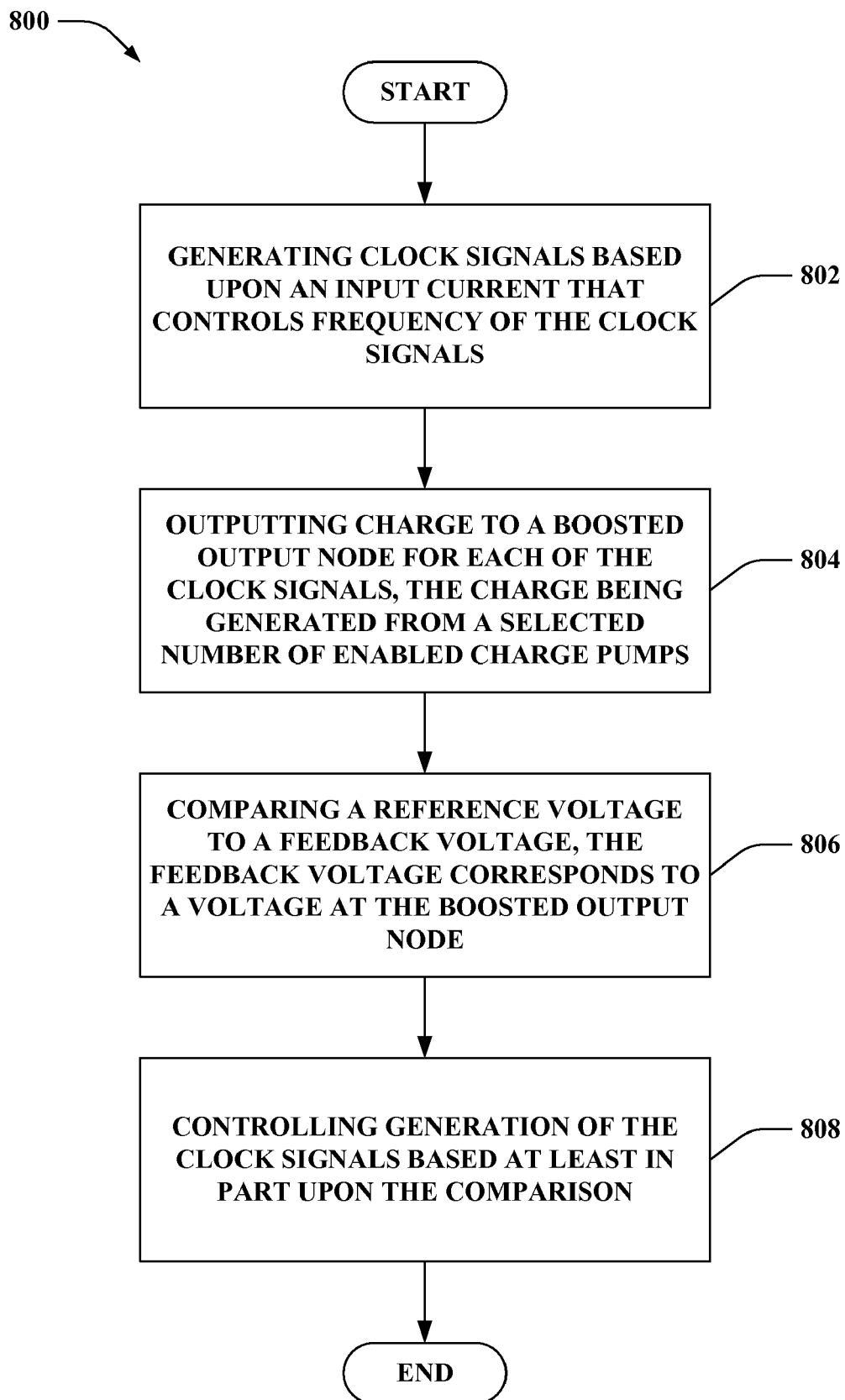
FIG. 8 illustrates an example methodology that facilitates controlling a booster utilized in connection with a CMOS sensor imager.

FIGS. 7-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 7, illustrated is a methodology 700 that facilitates reducing lag and dark current in a CMOS sensor imager. At 702, a bus connected to gates of pixels in a pixel array of a CMOS sensor imager can be pre-charged to a first voltage level. For instance, pre-charging can occur while in global shutter mode or in rolling shutter mode. Further, pre-charging can enable the bus to quickly transition to a high voltage level (e.g., Vdd) or a low voltage level (e.g., Ground), where the high voltage level or the low voltage level can be the first voltage level. According to an illustration, the bus can be pre-charged to switch from the low voltage level (e.g., Ground) or a voltage boosted below the low voltage level (e.g., V_Boost_negative) to the high voltage level (e.g., Vdd). By way of another example, the bus can be pre-charged to switch from the high voltage level (e.g., Vdd) or a voltage boosted above the high voltage level (e.g., V_Boost_positive) to the low voltage level (e.g., Ground). Further, the bus can connect to gates of transfer transistors and/or gates of reset transistors of the pixels in the pixel array.

At 704, the bus can be boosted from the first voltage level to a second voltage level. For instance, when the first voltage level is the high voltage level (e.g., Vdd), the bus can be boosted above such high voltage level to V_Boost_positive. Moreover, when the first voltage level is the low voltage level (e.g., Ground), the bus can be boosted below such low voltage level to V_Boost_negative. Moreover, boosting can occur subsequent to discontinuation of pre-charging of the bus.

Turning to FIG. 8, illustrated is a methodology 800 that facilitates controlling a booster utilized in connection with a CMOS sensor imager. At 802, clock signals can be generated based upon an input current that controls frequency of the clock signals. Further, the clock signals can be yielded upon receiving a Boost_en signal, while generation of the clock signals can be inhibited when the Boost_en signal is not received. The Boost_en signal, for instance, can be received (e.g., from a read state machine) subsequent to pre-charging of a boosted output node. At 804, charge can be outputted to a boosted output node for each of the clock signals, where the charge can be generated from a selected number of enabled charge pumps. For instance, N charge pumps can be available, and a subset or all of the N charge pumps can be selected to be enabled (e.g., activated). At 806, a reference voltage can be compared to a feedback voltage, where the feedback voltage can correspond to a voltage at the boosted output node. For instance, the feedback voltage can equal a resistance ratio of resistors in a resistor divider times a voltage of the boosted output node. Further, the reference voltage can be adjustable (e.g., using a digital to analog converter (DAC)) to adjust the voltage of the boosted output node. At 808, generation of the clock signals can be controlled based at least in part upon the comparison. For example, generation of the clock signals can be inhibited when the feedback voltage is greater than the reference voltage for positive boosting or when the feedback voltage is less than the reference voltage for negative boosting.

Figure 9:
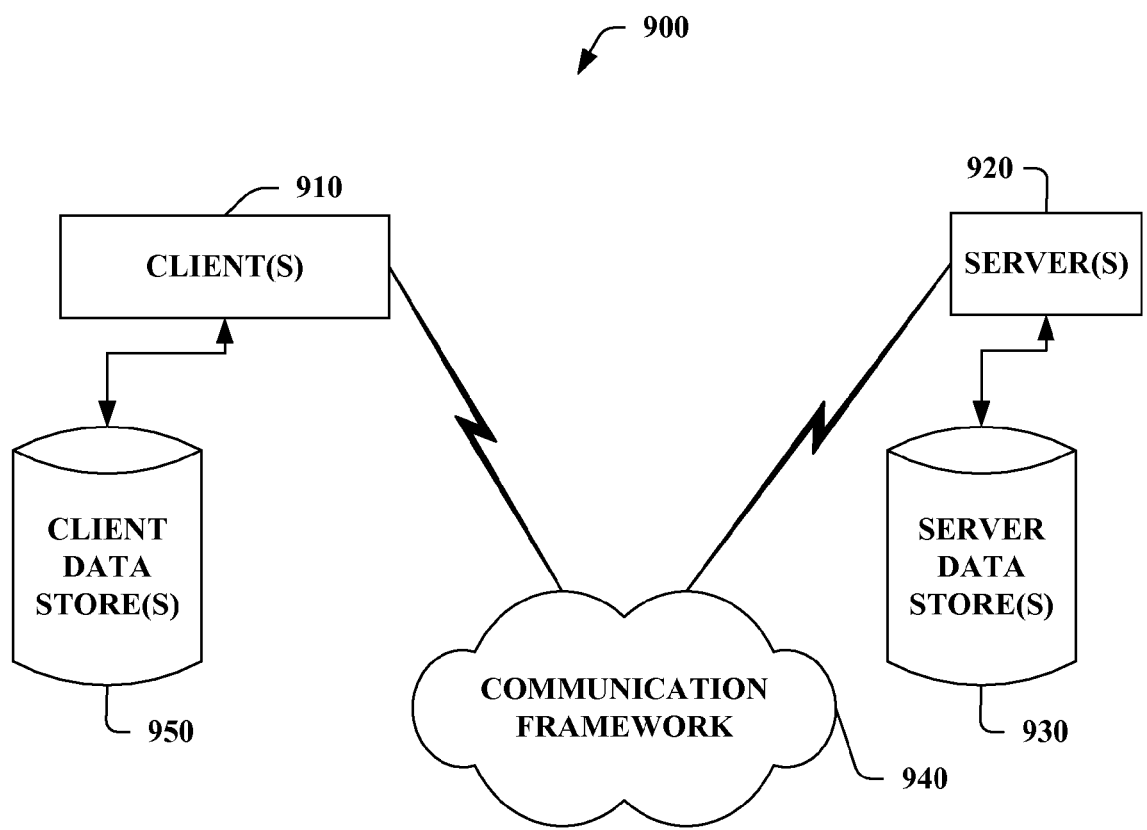
FIG. 9 illustrates an example networking environment, wherein the novel aspects of the claimed subject matter can be employed.
Figure 10:
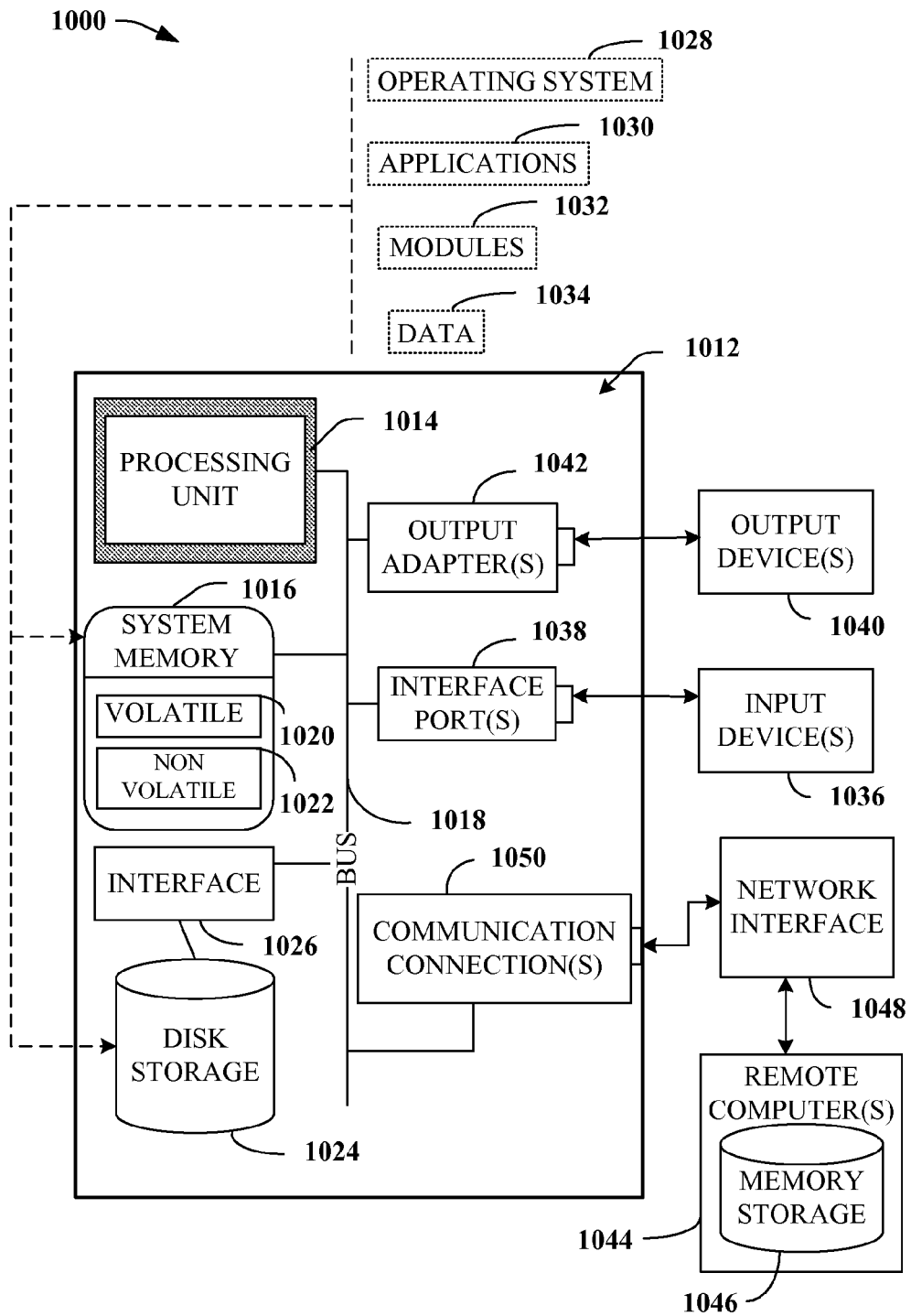
FIG. 10 illustrates an example operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For instance, FIGS. 9-10 set forth a suitable computing environment that can interact with the CMOS sensor imagers described herein. According to an example, output yielded by the CMOS sensor imagers described above can be obtained and/or further operated upon via employing the following exemplary computing environment and/or operation of boosters used with the CMOS sensor imagers can be controlled via using the following exemplary computing environment. However, it is to be appreciated that the claimed subject matter need not be employed in connection with the computing environment described below.

While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that boosts voltage upon a node connected to pixels in a complementary metal-oxide-semiconductor (CMOS) imaging system-on-chip (iSoC) sensor, comprising:
    a vertical output driver that outputs a signal upon a node connected to at least one of gates of reset transistors of pixels in a pixel array or gates of transfer transistors of pixels in the pixel array;
    a pre-charger that transitions a voltage of the node to a first voltage level, the pre-charger comprises a high pre-charge circuit and a low pre-charge circuit, the high pre-charge circuit comprises two p-type metal-oxide-semiconductor (PMOS) transistors with isolated n-wells, and the low pre-charge circuit comprises two n-type metal-oxide-semiconductor (NMOS) transistors with isolated p-wells; and
    a booster with operation that varies according to at least one degree of freedom, the booster further adjusts the voltage of the node from the first voltage level to a second voltage level.

2. The system of claim 1, the at least one degree of freedom of the booster being at least one of speed of the booster proceeding to the second voltage level, frequency of yielding charge to the node, the second voltage level, or timing of the booster and the pre-charger.

3. The system of claim 1, the booster further comprising:
    a voltage-controlled oscillator (VCO) that outputs clock signals at a frequency set by an inputted current;
    a set of charge pumps parallel to each other, a subset of the set of charge pumps being activated via an enable bus to generate charge outputted upon the node for each of the clock signals;
    a resistor divider that generates a feedback voltage as a function of a voltage of the node;
    a comparator that compares the feedback voltage to a reference voltage; and
    an AND gate that enables or inhibits the VCO at a given time based upon output of the comparator and a boost enable signal.

4. The system of claim 3, the reference voltage being adjustable to control the second voltage level to which the booster adjusts the voltage of the node.

5. The system of claim 3, a step size of the booster being adjustable based upon a number of charge pumps in the subset that are activated.

6. The system of claim 3, the frequency of the booster being adjustable as a function of the inputted current.

7. The system of claim 3, the comparator disables the booster when the second voltage level is reached at the node.

8. The system of claim 3, further comprising a control component that disables and enables the booster based upon timing communicated via the boost enable signal.

9. The system of claim 1, the high pre-charge circuit brings a Vhigh bus included in the vertical output driver to a level of Vdd volts upon receiving a pre-charge high signal, and the low pre-charge circuit brings a Vlow bus included in the vertical output driver to a level of Ground volts upon receiving a pre-charge low signal.

10. The system of claim 9, the high pre-charge circuit initially raises the voltage of the node to Vdd volts and the booster further raises the voltage of the node to V_Boost_positive volts.

11. The system of claim 9, the low pre-charge circuit initially lowers the voltage of the node to Ground volts and the booster further lowers the voltage of the node to V_Boost_negative volts.

12. The system of claim 9, the high pre-charge circuit includes body connections that isolate the Vhigh bus from Vdd when the high pre-charge circuit is in the off state to mitigate flowing of substrate current, and the low pre-charge circuit includes body connections that isolate the Vlow bus from Ground when the low pre-charge circuit is in the off state to mitigate flowing of substrate current.

13. The system of claim 1, the pre-charger being a distributed device that provides increased width to enable handling pre-charge of the entire pixel array.

14. The system of claim 1, the pre-charger and the booster operate in a global shutter mode or a rolling shutter mode.

15. A method that facilitates reducing lag and dark current in a complementary metal-oxide-semiconductor (CMOS) sensor imager, comprising:
pre-charging a bus connected to gates of pixels in a pixel array of the CMOS sensor imager to a first voltage level;
setting a booster speed as a function of an input current to a voltage-controlled oscillator (VCO); and
boosting the bus from the first voltage level to a second voltage level at the booster speed set as a function of the input current to the VCO.

16. The method of claim 15, further comprising:
generating clock signals based upon the input current that controls frequency of the clock signals;
outputting charge to the bus for each of the clock signals, the charge being generated from a selected number of enabled charge pumps;
comparing a reference voltage to a feedback voltage, the feedback voltage corresponds to a voltage at the bus; and
controlling generation of the clock signals based at least in part upon the comparison.

17. The method of claim 15, further comprising pre-charging the bus while in global shutter mode or in rolling shutter mode.

18. The method of claim 15, further comprising boosting the bus subsequent to discontinuation of pre-charging the bus.

19. The method of claim 15, further comprising:
controlling a step size as a function of a signal that indicates a number of charge pumps from a set of charge pumps to activate at a given time; and
boosting the bus from the first voltage level to the second voltage level with the step size controlled as a function of the signal that indicates the number of charge pumps from the set of charge pumps to activate at the given time.

20. A system that enables controlling a booster utilized in a complementary metal-oxide-semiconductor (CMOS) sensor imager, comprising:
means for generating clock signals for the booster based upon an adjustable input bias current that controls frequency of the clock signals for the booster;
means for controlling a number of activated charge pumps of the booster;
means for outputting charge to a boosted output node for each of the clock signals, the charge being a function of the number of activated charge pumps of the booster;
means for generating a feedback voltage based upon a voltage at the boosted output node;
means for comparing an adjustable reference voltage to the feedback voltage; and
means for controlling generation of the clock signals for the booster based upon the comparison and a received boost enable signal that controls when the booster is in an on state.

* * * * *